(12) United States Patent
Cheong et al.

(10) Patent No.: US 7,038,977 B2
(45) Date of Patent: May 2, 2006

(54) OPTICAL PICKUP ACTUATOR

(75) Inventors: Young-min Cheong, Seoul (KR);
Jin-won Lee, Gyeonggi-do (KR);
Dae-hwan Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 558 days.

(21) Appl. No.: 10/125,562

(22) Filed: Apr. 19, 2002

(65) Prior Publication Data

US 2002/0181124 A1 Dec. 5, 2002

(30) Foreign Application Priority Data

Apr. 20, 2001 (KR) ................................ 2001-21358

(51) Int. Cl.
*G11B 7/00* (2006.01)
*G02B 3/02* (2006.01)

(52) U.S. Cl. ................................ 369/44.16; 369/44.15; 369/44.22; 359/812; 359/814; 359/824; 359/719

(58) Field of Classification Search ............ 369/44.15, 369/112.23, 44.18, 44.14, 244, 44.16, 44.22; 359/813, 814, 824, 819, 812, 719; 720/684, 720/688
See application file for complete search history.

(56) References Cited

U.S. PATENT DOCUMENTS

| 5,446,721 | A | * | 8/1995 | Sekimoto et al. | ............ | 720/684 |
| 5,581,533 | A | * | 12/1996 | Fujisawa | ................ | 369/112.23 |
| 5,684,645 | A | * | 11/1997 | Tomiyama et al. | .......... | 359/824 |
| 6,285,644 | B1 | * | 9/2001 | Kano | ..................... | 369/112.23 |
| 6,317,277 | B1 | * | 11/2001 | Izumino et al. | ............. | 359/813 |

FOREIGN PATENT DOCUMENTS

| JP | 11-25483 | 1/1999 |
| JP | 2001-14698 | 1/2000 |

* cited by examiner

*Primary Examiner*—Tan Dinh
*Assistant Examiner*—Kim-Kwok Chu
(74) *Attorney, Agent, or Firm*—Stein, McEwen & Bui, LLP

(57) ABSTRACT

An optical pickup actuator includes a base having a holder installed at one side thereof, a moving portion in which an objective lens is installed at the periphery thereof and a guide hole is formed, a bobbin coupled to the guide hole, a magnetic driving portion provided at the base and symmetrically arranged to make the moving portion perform focusing and tracking, and suspensions having one end supported at the holder and the other end fixed to the moving portion to be connected to the bobbin. Thus, since the magnetic driving portion is symmetrically arranged, a pitching mode and a rolling mode generated due to an asymmetrical structure are prevented. Also, the AC sensitivity and DC sensitivity can be improved.

11 Claims, 6 Drawing Sheets

OPTICAL PICKUP ACTUATOR

CROSS-REFERENCE TO RELATED APPLICATIONS

This application claims the benefit of Korean Application No. 01-21358, filed Apr. 20, 2001, in the Korean Industrial Property Office, the disclosure of which is incorporated herein by reference.

BACKGROUND OF THE INVENTION

1. Field of the Invention

The present invention relates to an optical pickup actuator, and more particularly, to an optical pickup actuator having an improved structure which is driven along a drive axis different from the optical axis of an objective lens and removing factors affecting the generation of a subsidiary resonance due to the leakage magnetic flux to improve sensitivity.

2. Description of the Related Art

In general, optical pickup assemblies are adopted in optical recording and/or reproduction apparatuses to perform recording and/or reproduction of information in a non-contact manner with respect to a disk, which is a recording medium loaded on a turntable, while moving across the disk.

The optical pickup assemblies include actuators to drive an objective lens in a track direction and a focus direction so that a light spot is focused at a desired track position of an optical disk. However, since portable personal computers such as laptops need to be manufactured thin and light, the entire volume of the system is restricted, and thus an actuator adopted by the system needs to be slim. A reflective mirror to make a light beam proceed toward the objective lens is adopted in the optical pickup. To meet the need of a slim actuator, an asymmetrical actuator has been suggested, in which a drive axis of an actuator is different from an optical axis of an objective lens so that the distance between the objective lens of the optical pickup and the reflective mirror can be reduced. An example of the asymmetrical actuator is disclosed in U.S. Pat. No. 5,684,645.

Referring to FIGS. 1 and 2, a conventional optical pickup actuator 10 has a holder 14 at one side thereof and a focusing coil 18 wound around along the outer circumferential surface of a bobbin 12 having a first guide hole 16a formed at the center thereof. A pair of tracking coils 15 are wound at one side of the bobbin 12. Also, a second guide hole 16b is formed in a moving portion 17 where an objective lens 11 is installed at one side thereof. The bobbin 12 is accommodated in the second guide hole 16b. Here, a U-shaped yoke 31 is inserted into the first and second guide holes 16a and 16b. A magnet 32 is provided at one side of the yoke 31 to face the tracking coils 15.

The moving portion 17 is supported by two pairs of suspensions 13a and 13b, with each suspension 13a and 13b having one end thereof fixed to the holder 14 and the other end fixed to the moving portion 17. The pairs of suspensions 13a and 13b are on opposite sides of the moving portion 17. The moving portion 17 and the bobbin 12 are coupled to be moved together.

When current is applied to the focusing coil 18 and the tracking coils 15, the focusing coil 18 and the tracking coils 15 receive forces by the electromagnetic interoperation between the magnet 32, the focusing coil 18, and the tracking coils 15, so that the moving portion 17 is moved. The direction in which the focusing coil 18 and the tracking coils 15 receive the forces is determined by Fleming's left hand rule.

Thus, when the electromagnetic force acts by the interoperation between the magnet 32, the focusing coil 18, and the tracking coils 15, the bobbin 12 is moved in the focusing direction F or the tracking direction T. Accordingly, as the moving portion 17, coupled to the bobbin 12, moves together with the bobbin 12, the objective lens 11 moves so that the position at which a light spot is focused is adjusted.

FIGS. 3A and 3B are schematic views illustrating the electromagnetic interoperation between the focusing coil 18 and the magnet 32. Here, the focusing coil 18 can be divided into an inner focusing coil 18a disposed inside the yoke 31 and an outer focusing coil 18b disposed outside the yoke 31. However, while the inner focusing coil 18a receives an electromagnetic force by the interoperation with the magnet 32, the outer focusing coil 18b, blocked by the yoke 31, is not affected by the magnet 32. Actually, as indicated by the dotted lines of FIG. 3A, the magnetic lines of force produced by the magnet 32 are spread widely at the edges of the magnet 32 so that the magnetic flux is leaked outside the yoke 31.

The leakage magnetic flux affects the outer focusing coil 18b. In FIG. 3A, the arrows from the focusing coil 18 show the size and direction of forces applied to the focusing coil 18 according to the distribution of the magnetic lines of force by Fleming's left hand rule. The outer focusing coil 18b receives a force generated by the leakage magnetic flux, which causes an unbalanced distribution of forces from the viewpoint of the whole focusing coil 18. That is, as shown in FIG. 3B, since a force Fu applied to the inner focusing coil 18a and a force Fd applied to the outer focusing coil 18b are not balanced, a pitching mode in which the bobbin 12 and the moving portion 17 are swayed back and forth, as indicated by an arrow P in FIG. 3B, is generated.

Also, the outer focusing coil 18b is not used for the focusing operation but only increases weight and resistance of a winding coil, causing deterioration of sensitivity of the actuator. Thus, the outer focusing coil 18b becomes an obstacle with respect to a high speed following capability according to a high multiple speed of a disk.

Meanwhile, when the bobbin 12 moves in the track direction T by the tracking coils 15 (FIGS. 1 and 2), since the center point of the movement is not congruous with the center (G) of gravity, a rolling mode is generated. As illustrated in FIG. 4A, when the bobbin 12 (see FIG. 1) stands still, the center (G) of gravity of the entire actuator 10 and the center (H) of movement are congruous. In the figure, the arrows denote the size and direction of a force applied to the tracking coils 15 by the magnet 32. The magnitude of the force received by the tracking coils 15 depends on the current flowing in the tracking coil 15 and the amount of magnetic flux. Assuming that the current is constant, the size of the force received by the tracking coils 15 depends on the amount of magnetic flux only. However, the magnetic flux is the largest at the central portion of the magnet 32 and decreases from the central portion of the magnet 32 to the edge thereof.

When the tracking coils 15 are at a neutral position, as shown in FIG. 4A, since the magnetic flux is distributed symmetrically with respect to the tracking coils 15, the center (G) of gravity and the center (H) of movement are congruous.

However, as illustrated in FIG. 4B, when the bobbin 12 (see FIG. 2) moves upward due to the focusing coil 18, the force of the magnet 32 affecting the tracking coils 15 is biased to the lower side of the tracking coil 15. Thus, since the tracking force on the lower side of the bobbin 12 is greater than the tracking force on the upper side thereof, a rotational moment is generated in a direction $R_1$.

To the contrary, as illustrated in FIG. 4C, when the bobbin 12 moves downward by the focusing coil 18, the force of the magnet 32 affecting the tracking coils 15 is biased to the upper side of the tracking coil 15. Thus, since the tracking force on the upper side of the bobbin 12 is greater than the tracking force on the lower side thereof, a rotational moment is generated in a direction $R_2$.

As a result, as illustrated in FIG. 4D, since the center (H) of movement and the center (G) of gravity of the tracking coil 15 are not congruous according to the focusing operation of the bobbin 12, a rolling mode in which the bobbin 12 rolls in directions R1 and R2 is generated.

A rotation/vibration mode, such as the pitching mode and a rolling mode has an ill effect on the phase and displacement of a basic frequency during the focusing and tracking operations. Accordingly, an optical signal is deteriorated. Thus, when the physical size of the magnet 32 is increased to increase the density of magnetic flux so that AC sensitivity is improved, since a subsidiary resonance is produced, there is a limit in increasing the density of magnetic flux. Further, during high multiple speed of high density optical recording and/or reproduction apparatuses, since the pitching mode and rolling mode become more serious, an optical pickup actuator suitable with high multiple speed optical recording and/or reproduction apparatuses is required.

SUMMARY OF THE INVENTION

Accordingly, it is an object of the present invention to provide an optical pickup actuator in which a focusing coil and tracking coils are arranged symmetrically to reduce the generation of a pitching mode and a rolling mode due to the leakage magnetic flux in the asymmetrical structure and, by increasing an effective coil length, a magnetic driving portion is made compact with high sensitivity.

Additional objects and advantages of the invention will be set forth in part in the description which follows and, in part, will be obvious from the description, or may be learned by practice of the invention.

The foregoing and other objects of the present invention are achieved by providing an optical pickup actuator comprising a base having a holder installed at one side thereof, a moving portion in which an objective lens is installed at the periphery thereof and a guide hole is formed, a bobbin coupled to the guide hole, a magnetic driving portion provided at the base and symmetrically arranged to make the moving portion perform focusing and tracking, and a suspension having one end supported at the holder and the other end fixed to the moving portion to be connected to the bobbin.

In an embodiment of the present invention, the magnetic driving portion comprises first, second, and third yoke members fixedly installed on the base at a predetermined interval to face one another, a focusing coil wound around the outer circumferential surface of the bobbin inserted around the second yoke member to be capable of moving, first and second magnets attached to the inner surfaces of the first and third yoke members, and tracking coils arranged symmetrically to face the first and second magnets.

An embodiment of the present invention also provides that the bobbin has a cavity therein.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE INVENTION

Figure 1:
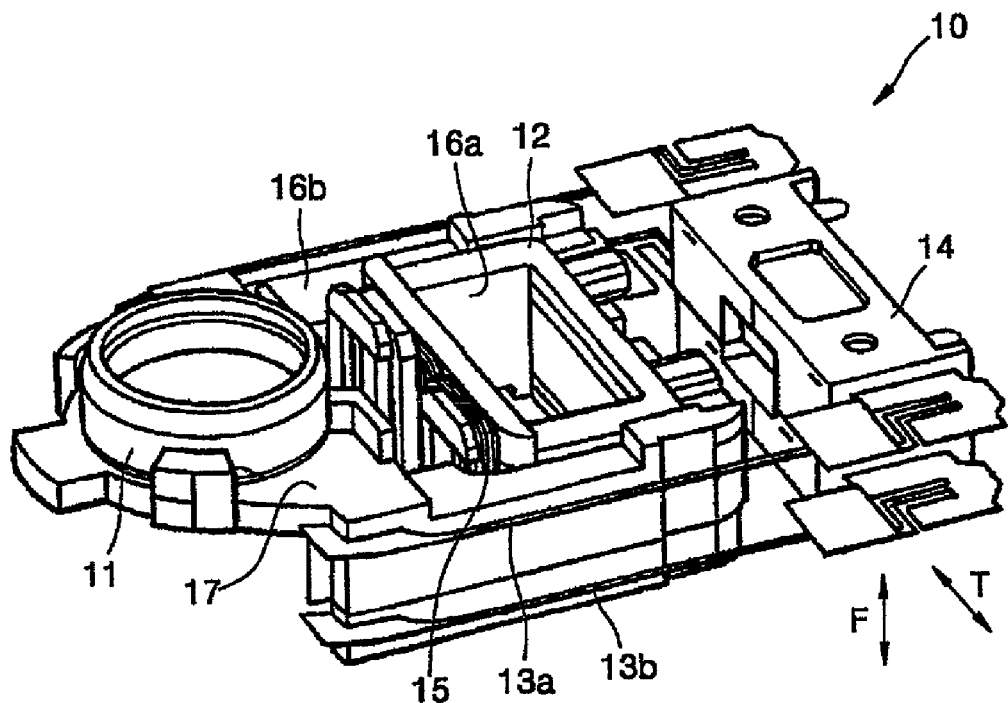
FIG. 1 is a perspective view of a conventional optical pickup actuator.
Figure 2:
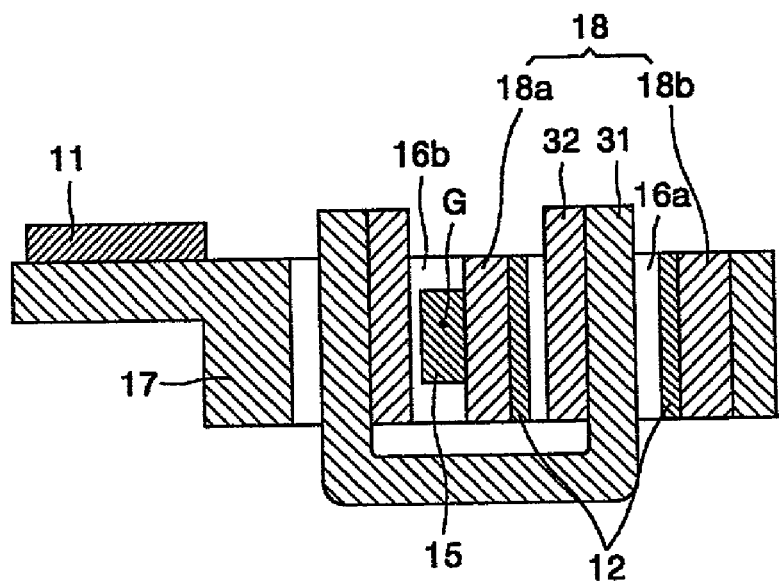
FIG. 2 is a sectional view of the conventional optical pickup actuator.
Figure 3A:
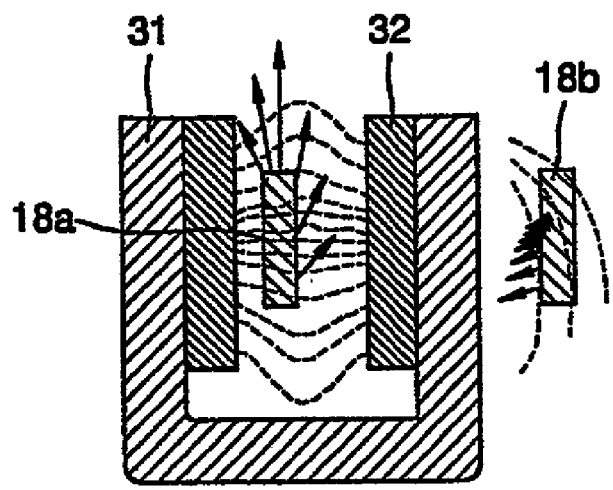
FIGS. 3A and 3B are views illustrating the distribution of lines of magnetic force in the conventional optical pickup actuator of FIG. 1 and a subsequent rotational moment.
Figure 3B:
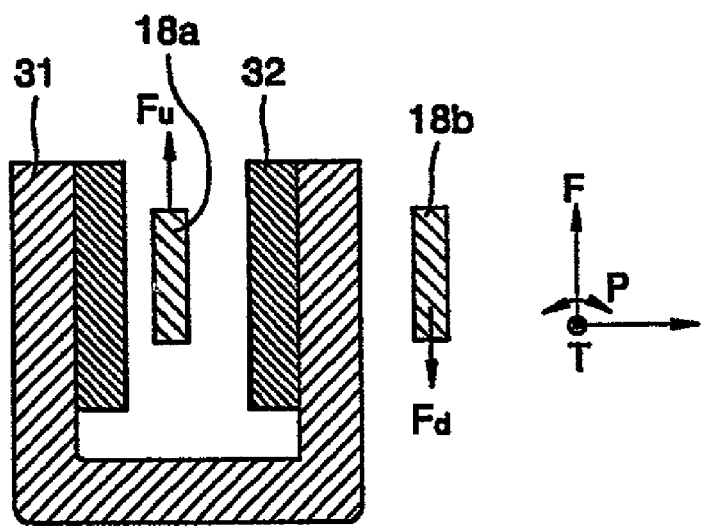
Figure 4A:
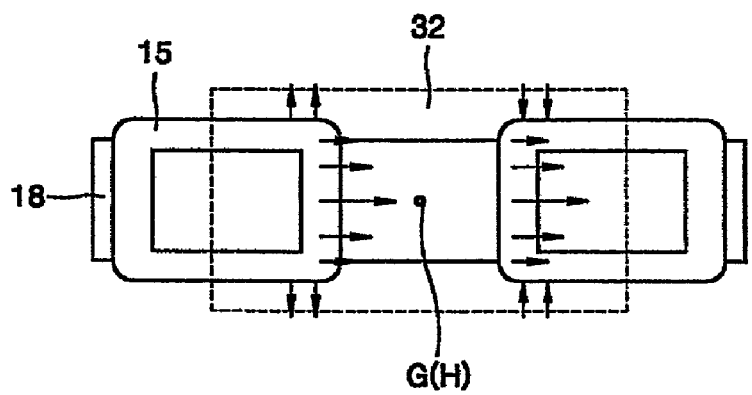
FIGS. 4A and 4D are views illustrating a rolling mode by a tracking coil in the conventional optical pickup actuator of FIG. 1.
Figure 4B:
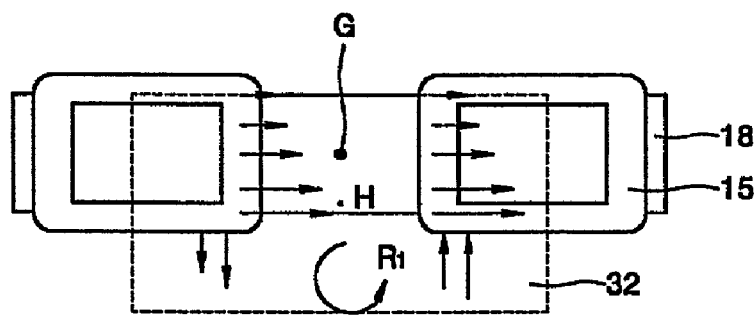
Figure 4C:
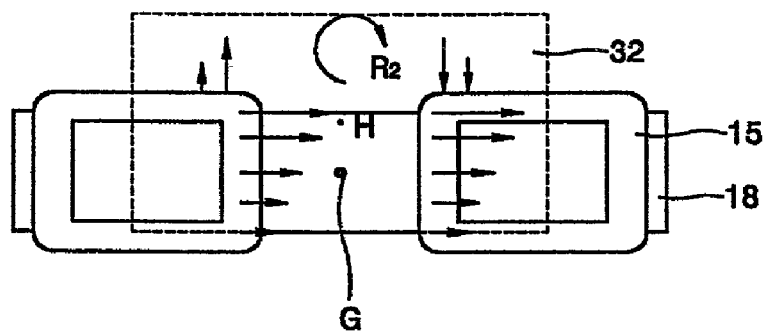
Figure 4D:
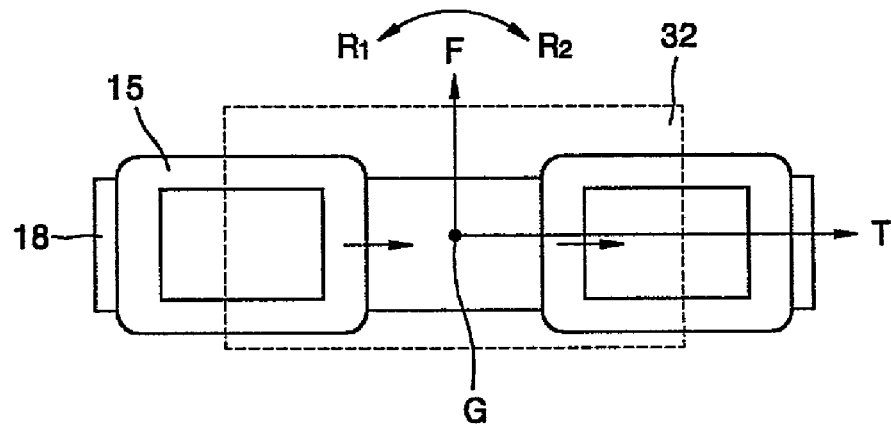

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 5:
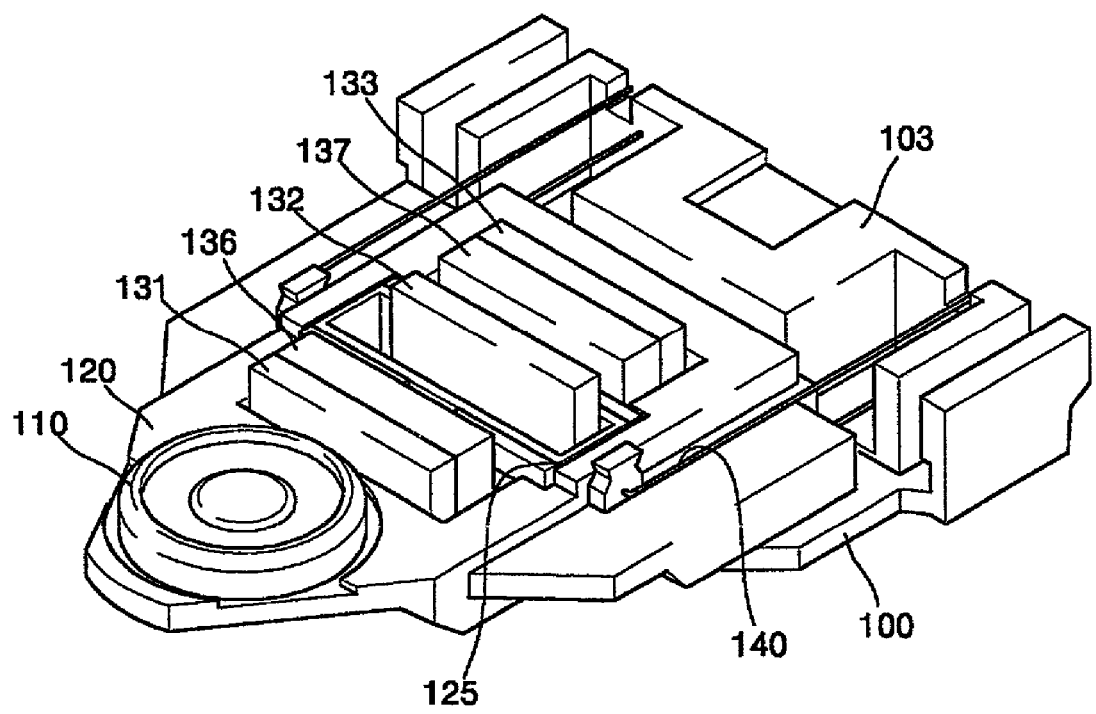
FIG. 5 is a perspective view of an optical pickup actuator according to an embodiment of the present invention.
Figure 6:
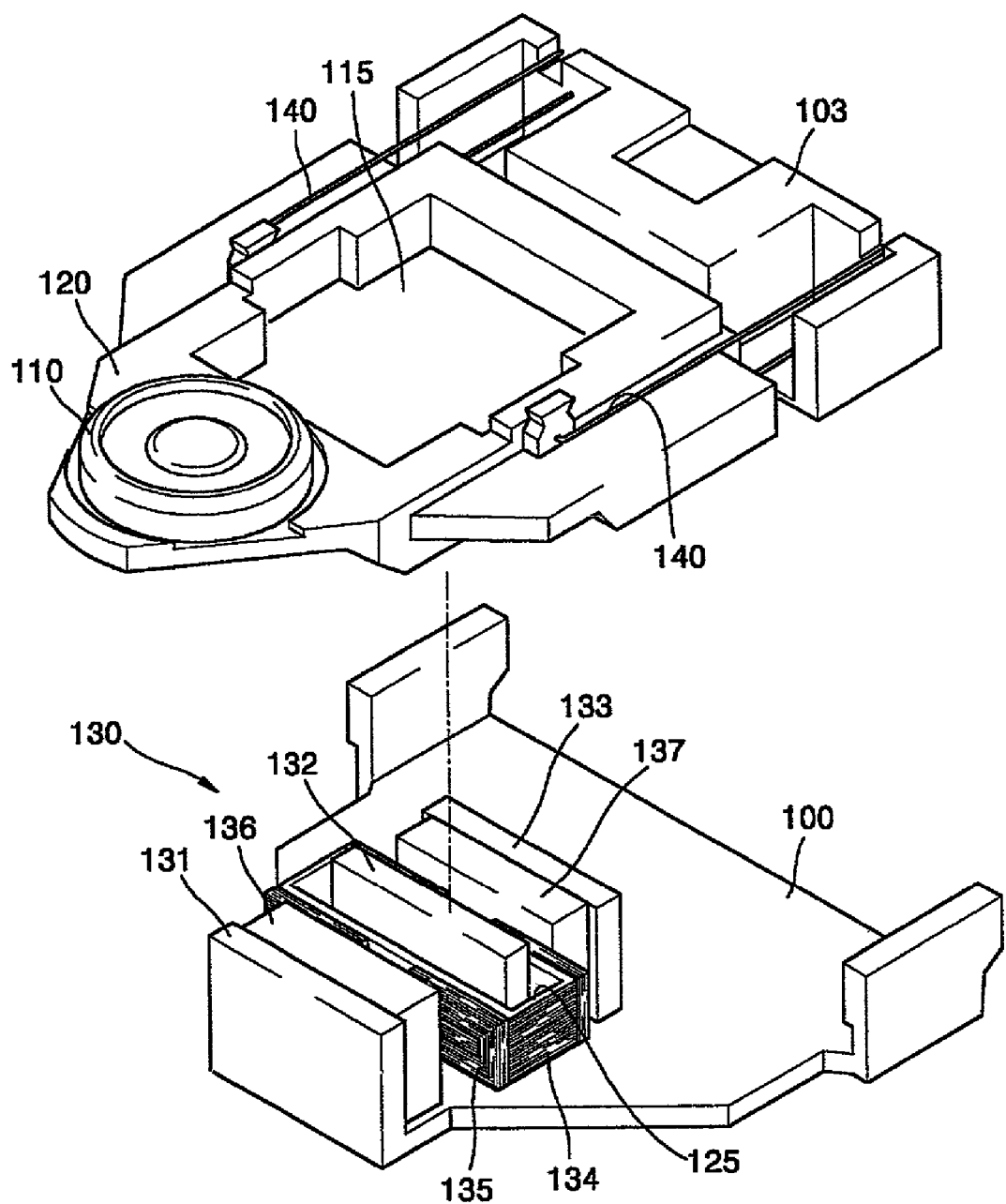
FIG. 6 is an exploded perspective view of the optical pickup actuator of FIG. 5.

Referring to FIGS. 5 and 6, an optical pickup actuator according to the present invention includes a base 100 having a holder 103 installed at one side thereof, a moving portion 120 having an objective lens 110 provided at the periphery thereof and a guide hole 115 formed in the middle portion thereof, a bobbin 125 coupled to the guide hole 115, a magnetic driving portion 130 accommodated in the guide hole 115 to move the moving portion 120 in a focusing direction and a tracking direction, and suspensions 140 having one end supported by the holder 103 and the other end fixed to one side of the moving portion 120 to be connected to the bobbin 125.

The bobbin 125 is accommodated in the guide hole 115 and coupled to the moving portion 120 such that the bobbin 125, the guide hole 115 and the moving portion 120 are capable of moving together. The moving portion 120 is supported by the suspensions 140. The suspension 140 elastically supports the moving portion 120 and the bobbin 125 so that they can perform tracking and focusing operations. Simultaneously, each suspension 140 serves as a wire through which current is provided to the magnetic driving portion 130.

The magnetic driving portion 130 includes first, second, and third yoke members 131, 132, and 133 fixedly installed on the base 100 to face each other at a predetermined interval, a focusing coil 134 wound around the outer circumferential surface of the bobbin 125, which in turn is inserted around the second yoke member 132 and to be capable of moving, first and second magnets 136 and 137 attached to the inner side surfaces of the first and third yoke members 131 and 133, and tracking coils 135 symmetrically provided to face the first and second magnets 136 and 137.

Here, the magnetic flux generated by the first magnet 136 is uniformly distributed between the first and second yoke members 131 and 132 and the magnetic flux generated by the second magnet 137 is uniformly distributed between the second and third yoke members 132 and 133.

The focusing coil 134 is wound around the bobbin 125, which in turn is inserted around the second yoke member 132 and to be capable of moving. The focusing coil 134 receives symmetrical electromagnetic forces from its opposite sides thereof by the interoperations between the first magnet 136 and a corresponding portion of the focusing coil 134 facing the magnet 136, and the second magnet 137 and a corresponding portion of the focusing coil 134 facing the magnet 137. Thus, compared with the focusing coil in the conventional actuator, double the effective coil length can be obtained than in the conventional case in which one side of the focusing coil is used asymmetrically as an effective coil. Accordingly, as the entire length of the focusing coil 134 to obtain the same driving force is decreased, thus requiring a reduced number of winding, the overall weight of the actuator can be reduced. Thus, the AC sensitivity and DC sensitivity can be improved compared with the conventional case.

Figure 7:
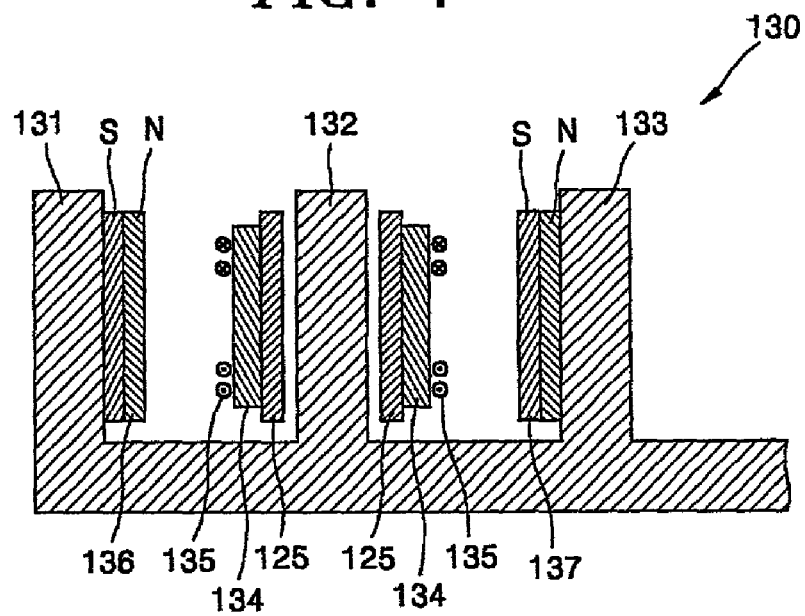
FIG. 7 is a sectional view of a magnetic driving portion of the optical pickup actuator of FIG. 5.

The tracking coils 135, as illustrated in FIG. 7, are symmetrically provided on the focusing coil 134 to face the first and second magnets 136 and 137. Alternatively, the tracking coils 135 are provided to face the first and second magnets 136 and 137 and then the focusing coil 134 can be wound thereon. Then, only portions of the tracking coils 135 wound in a rectangular shape that face the first magnet 136 and the second magnet 137 contribute to the tracking operation. Since forces applied to the other portion of the tracking coils 135 are the same in size but opposite in directions, they are offset. Otherwise, the other portion of the tracking coils 135 is located out of the range of distribution of magnetic flux so that it is not affected. Thus, the tracking coils 135 contribute to the tracking operation symmetrically from both sides of the second yoke member 132.

As described above, since the tracking coils 135 are symmetrically installed with respect to the second yoke member 132, the effective length of a tracking coil increases double compared with the conventional case in which the tracking coils are installed asymmetrically. Thus, the same tracking operation force can be obtained with a reduced number of windings of the tracking coils. Accordingly, the thickness of the tracking coils 135 can be reduced. As a result, since the entire thickness of windings of the tracking coils 135 is reduced, the interval between each tracking coil 135 and corresponding first or second magnet 136 or 137 is reduced, so that the entire size of the actuator can be decreased. Also, as the interval between the coil and magnet is reduced, an electromagnetic force increases compared with the case in which the number of windings is the same.

Figure 8:
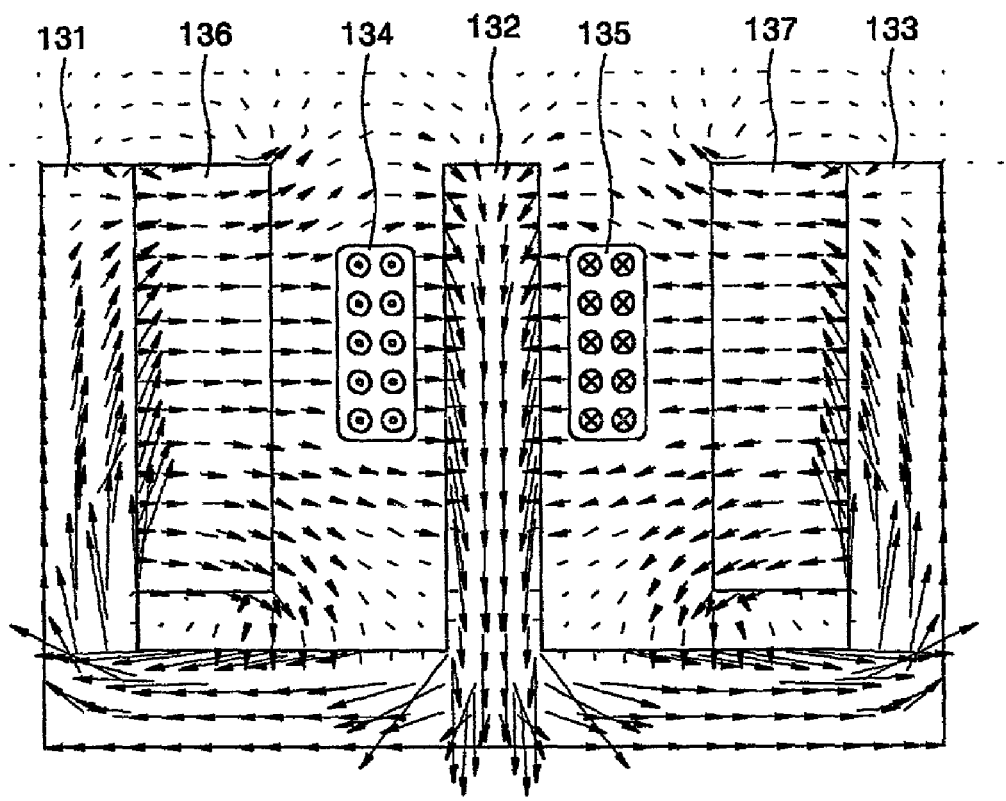
FIG. 8 is a view illustrating the distribution of lines of magnetic force in the optical pickup actuator of FIG. 5.

In the meantime, the second yoke member 132 also serves as a guide to help the bobbin 125 perform tracking and focusing operations. Also, in the present invention, since the second yoke member 132 is provided, as illustrated in FIG. 8, the magnetic fluxes generated by the first magnet 136 and the second magnet 137 are not leaked into the area of the other magnet. Further, even when the magnetic flux is leaked to affect the opposite focusing coil 134 and the tracking coils 135, since these coils are arranged symmetrically with respect to the second yoke member 132, the influence of the leakage magnetic flux is offset. Thus, a subsidiary resonance due to the leakage magnetic flux is not generated.

Accordingly, since there is no need to arrange the corresponding focusing coil 134 away from the magnets 136 and 137 as far as possible to avoid a pitching mode, the interval between the coil and magnet is significantly reduced so that a slim optical pickup actuator can be manufactured. Since a force received with respect to the same magnetic flux is proportional to the distance, as the distance between the magnet and the coil decreases, an effect of reducing the number of windings of the coil with respect to the same driving force is generated.

Next, the results of simulations of AC sensitivity for the cases in which the magnetic driving portion 130 is symmetrically configured and the magnetic driving portion 130 is asymmetrically configured are shown in the following table.

| AC Sensitivity | Existing products | | Products according to the present invention | |
| --- | --- | --- | --- | --- |
| (μm/V) | Focusing | Tracking | Focusing | Tracking |
| 1 | 74.21 | 46.3 | 136.7 | 44.36 |
| 2 | 70.89 | 39.7 | 136.9 | 45.97 |
| 3 | 71.41 | 44.53 | 138.5 | 45.18 |
| 4 | 70.02 | 35.26 | 134.1 | 43.45 |
| Average | 71.63 | 41.45 | 136.6 | 44.74 |

The above table shows that the AC sensitivity of focusing and tracking of the products according to the present invention is considerably increased compared to the existing products. The AC sensitivity can be improved by reducing the weight of the moving portion, increasing the density of magnetic flux, or increasing the effective coil length. In the present invention, by arranging the objective lens 110 at the periphery of the actuator, the distance between the objective lens 110 and a reflective mirror (not shown) is reduced so that the entire weight of the actuator is reduced. Also, by configuring the magnetic driving portion symmetrically, the effective length coil can be increased so that the AC sensitivity is improved.

As described above, in the optical pickup actuator according to the present invention, since the objective lens is arranged at the periphery of the moving portion, the axis along which the bobbin is moved by the magnetic driving portion does not match the optical axis of the objective lens so that the interval between the objective lens and the reflective lens can be minimized. Thus, the optical pickup actuator can be manufactured to be slim.

Also, the leakage magnetic fluxes of the first and second magnets 136 and 137 are reduced primarily by the second yoke member 132. Even when the leakage magnetic flux affects the opposite focusing coil, since the focusing coil is arranged symmetrically with respect to both sides of the second yoke member, a subsidiary resonance phenomenon due to an unbalanced rotational moment can be prevented. Thus, a tracking capability and a recording and/or reproduction characteristic of a high multiple speed optical disk are improved.

Although a few preferred embodiments of the present invention have been shown and described, it will be appreciated by those skilled in the art that changes may be made in these embodiments without departing from the principles and spirit of the invention, the scope of which is defined in the claims and the equivalents.

What is claimed is:

1. An optical pickup actuator comprising:
   a base having a holder installed at one side thereof;
   a moving portion in which an objective lens is installed at the periphery thereof and a guide hole is formed;
   a bobbin inserted within said guide hole;
   a magnetic driving portion, including tracking coils on opposite sides of said bobbin, provided at said base to make said moving portion perform degrees of focusing and tracking operations, said tracking coils providing a symmetric contribution to said tracking operation regardless of said degree of said focusing operation; and
   a suspension having one end supported at said holder and the other end fixed to said moving portion to be connected to said bobbin.

2. The optical pickup actuator as according to claim 1, wherein said bobbin has a cavity therein.

3. An optical pickup actuator comprising:
   a base having a holder installed at one side thereof;
   a moving portion in which an objective lens is installed at the periphery thereof and a guide hole is formed;
   a bobbin inserted within said guide hole;
   a magnetic driving portion provided at said base to make said moving portion focusing and tracking; and
   a suspension having one end supported at said holder and the other end fixed to said moving portion to be connected to said bobbin, wherein said magnetic driving portion comprises:
   first, second, and third yoke members fixedly installed on said base at predetermined intervals to face one another;
   a focusing coil wound around the outer circumferential surface of said bobbin, said bobbin and said focusing coil being inserted around said second yoke member and to be capable of moving;
   first and second magnets attached to inner surfaces of said first and third yoke members; and
   tracking coils arranged symmetrically to face said first and second magnets.

4. The optical pickup actuator according to claim 3, wherein said bobbin has a cavity therein.

5. An optical pickup actuator comprising:
   a holder;
   a moving portion, having an objective lens at one end and a guide hole centered therein, to perform degrees of tracking and focusing operations;
   suspensions connecting said holder to said moving portion; and
   a magnetic drive portion having a bobbin, a focusing member wound around said bobbin, and plural tracking members respectively arranged around opposite sides of said bobbin and said focusing member, such that said plural tracking members are symmetrically positioned with respect to said magnetic driving portion, said bobbin, focusing member and tracking members each positioned within said guide hole, said tracking members providing a symmetric contribution to said tracking operation regardless of said degree of said focusing operation.

6. The optical pickup actuator according to claim 5, wherein said magnetic driving portion further comprises a pair of magnets, each of said magnets positioned at opposite ends of and within said guide hole and symmetrically positioned at two opposite sides of said bobbin.

7. The optical pickup actuator according to claim 5, wherein said suspension elastically supports said moving portion and said bobbin to perform moving and tracking operations and includes a wire providing current to said focusing and tracking coils.

8. An optical pickup actuator comprising:
   a holder;
   a moving portion, having an objective lens at one end and a guide hole centered therein;
   suspensions connecting said holder to said moving portion; and
   a magnetic drive portion having a bobbin, a focusing member and plural tracking members each arranged around said bobbin such that said focusing member and said plural tracking members are symmetrically positioned with respect to said magnetic driving portion, said bobbin, focusing member and tracking members each positioned within said guide hole, wherein
   said magnetic driving portion further comprises a pair of magnets, each of said magnets positioned at opposite ends of and within said guide hole and symmetrically positioned at two opposite sides of said bobbin, and
   two tracking coils are provided on each of two sides of said focusing coil adjacent to and facing a respective magnet, each of said two sides of said focusing coil and their two respective tracking coils are symmetrically located with respect to said respective adjacent magnets.

9. An optical pickup actuator comprising:
   a holder;
   a moving portion, having an objective lens at one end and a guide hole centered therein;
   suspensions connecting said holder to said moving portion; and
   a magnetic drive portion having a bobbin, a focusing member and plural tracking members each arranged around said bobbin such that said focusing member and said plural tracking members are symmetrically positioned with respect to said magnetic driving portion, said bobbin, focusing member and tracking members each positioned within said guide hole, wherein
   said magnetic driving portion further comprises a pair of magnets, each of said magnets positioned at opposite ends of and within said guide hole and symmetrically positioned at two opposite sides of said bobbin, and
   two tracking coils are provided on said each of two sides of said bobbin adjacent to and facing a respective magnet, said focusing coil being wound around said bobbin and said tracking coils, each of said two sides of said bobbin and two respective tracking coils and focusing coil are symmetrically located with respect to said respective adjacent magnet.

10. An optical pickup actuator comprising:
    a holder;
    a moving portion, having an objective lens at one end and a guide hole centered therein;
    suspensions connecting said holder to said moving portion; and
    a magnetic drive portion having a bobbin, a focusing member and plural tracking members each arranged around said bobbin such that said focusing member and said plural tracking members are symmetrically positioned with respect to said magnetic driving portion, said bobbin, focusing member and tracking members each positioned within said guide hole, wherein said magnetic driving portion further comprises a pair of magnets, each of said magnets positioned at opposite ends of and within said guide hole and symmetrically positioned at two opposite sides of said bobbin, and, further comprising first, second and third yoke members, said first yoke member supporting one of said magnets, said third yoke member supporting the other magnet, and said second yoke member positioned between said first and third yoke members such that magnetic fluxes generated by each magnet are not leaked into an area of the other magnet.

11. An optical pickup actuator, including a base having a holder at one side thereof, a moving portion having a guide hole, and a suspension having one end supported at the holder and the other end fixed to the moving portion, the actuator comprising:

a bobbin, having a focusing coil wound therearound, within the guide hole and connected to the suspension;

first, second, and third yokes at the base such that the bobbin and the focusing coil surround the second yoke, to drive the moving portion to move in focusing and tracking directions;

first and second magnets attached to the first and third yoke members; and tracking coils arranged substantially symmetrically to face the first and second magnets.

* * * * *